(12) United States Patent
Zhou et al.

(10) Patent No.: US 11,863,007 B1
(45) Date of Patent: Jan. 2, 2024

(54) WHEEL-BASED CHARGER FOR WIRELESS SMART CONTROLLERS AND CARTS

(71) Applicant: Amazon Technologies, Inc., Seattle, WA (US)

(72) Inventors: Jinxue Zhou, Bellevue, WA (US); John Lewis Colucci, Seattle, WA (US); Zhongkai Chen, Sammamish, WA (US); Yiwen Luo, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 937 days.

(21) Appl. No.: 16/710,871

(22) Filed: Dec. 11, 2019

(51) Int. Cl.
| | |
|---|---|
| *H02J 7/14* | (2006.01) |
| *G05B 15/02* | (2006.01) |
| *B62B 3/00* | (2006.01) |
| *B62B 5/00* | (2006.01) |
| *H02K 7/116* | (2006.01) |

(52) U.S. Cl.
CPC .............. *H02J 7/1423* (2013.01); *B62B 3/00* (2013.01); *B62B 5/0096* (2013.01); *G05B 15/02* (2013.01); *H02K 7/116* (2013.01); *H02J 2207/20* (2020.01)

(58) Field of Classification Search
CPC ..... H02J 7/1407; H02J 7/1423; B62B 5/0056; B62B 5/0033; B62B 5/005; H02K 7/115
See application file for complete search history.

(56) References Cited

U.S. PATENT DOCUMENTS

| | | | | |
|---|---|---|---|---|
| 5,113,959 A | * | 5/1992 | Mastov | A61G 5/047 180/65.6 |
| 5,222,567 A | * | 6/1993 | Broadhead | B60K 1/00 180/907 |
| 6,343,665 B1 | * | 2/2002 | Eberlein | B62B 3/1492 180/19.1 |
| 7,779,941 B1 | * | 8/2010 | Rankin | B60T 1/10 180/19.1 |
| 8,276,692 B1 | * | 10/2012 | Nwaeke | B62B 5/06 180/19.1 |
| 8,672,081 B2 | * | 3/2014 | Kume | B62B 5/0026 180/19.1 |
| 2003/0089537 A1 | * | 5/2003 | Sinclair | A61G 5/047 180/65.1 |
| 2006/0032687 A1 | * | 2/2006 | Park | H02K 7/1846 180/65.51 |
| 2008/0066979 A1 | * | 3/2008 | Carter | B60L 58/22 180/65.51 |
| 2008/0122227 A1 | * | 5/2008 | Hammerle | B62B 5/0423 290/1 R |
| 2009/0315302 A1 | * | 12/2009 | Gray | B60B 33/0068 280/727 |

(Continued)

*Primary Examiner* — Jeffrey J Restifo
(74) *Attorney, Agent, or Firm* — Lee & Hayes, P.C.

(57) ABSTRACT

A wheel-based generator system for a utility cart is provided. The wheel-based generator system includes a generator, an omni-directional wheel coupled to the generator and configured to drive the generator as the utility cart is pushed across a floor, and a regulator coupled to the generator. The generator is configured to transform mechanical energy from motion of the omni-directional wheel into electrical energy for charging one or more batteries of one or more electronic devices on the utility cart. The regulator is configured to control at least one of an output voltage of the generator and a polarity of the output voltage of the generator.

20 Claims, 9 Drawing Sheets

(56) References Cited

U.S. PATENT DOCUMENTS

| | | | | |
|---|---|---|---|---|
| 2010/0078903 | A1* | 4/2010 | Bravo | H02K 7/1853 |
| | | | | 290/1 R |
| 2012/0150408 | A1* | 6/2012 | Takenaka | B62K 11/007 |
| | | | | 701/70 |
| 2012/0173041 | A1* | 7/2012 | Takenaka | B62J 45/4151 |
| | | | | 701/1 |
| 2012/0173088 | A1* | 7/2012 | Kobashi | B62K 11/007 |
| | | | | 701/49 |
| 2012/0173106 | A1* | 7/2012 | Takenaka | B62K 11/007 |
| | | | | 701/70 |
| 2013/0008732 | A1* | 1/2013 | Richter | A61G 5/048 |
| | | | | 180/11 |
| 2013/0299252 | A1* | 11/2013 | Block | B62B 5/005 |
| | | | | 180/15 |
| 2014/0262575 | A1* | 9/2014 | Richter | A61G 5/022 |
| | | | | 180/11 |
| 2017/0027785 | A1* | 2/2017 | Richter | A61G 5/128 |
| 2017/0129522 | A1* | 5/2017 | Lee | B60K 1/04 |
| 2018/0049930 | A1* | 2/2018 | Richter | A61G 5/048 |
| 2018/0078432 | A1* | 3/2018 | Richter | A61G 5/022 |
| 2020/0182634 | A1* | 6/2020 | Karceski | G01S 17/86 |
| 2020/0254895 | A1* | 8/2020 | Kim | H02J 7/0047 |
| 2021/0089037 | A1* | 3/2021 | Fukuoka | A61G 5/045 |

\* cited by examiner

WHEEL-BASED CHARGER FOR WIRELESS SMART CONTROLLERS AND CARTS

BACKGROUND

The present disclosure relates to a wheel-based generator assembly for charging electronic devices.

Many facilities (e.g., warehouses, plants, distribution centers, storehouses, factories, etc.) perform tasks such as storing items, packaging items, shipping items, and the like. Such facilities generally use various transport devices (e.g., carts, containers, pallets, bins, etc.) to transport items to different locations inside and/or outside the facility. As an example, an associate may retrieve items from storage and use a cart to transport the items to a location in preparation for shipping. In another example, an associate can load items onto a cart from a loading dock and transport the items to a storage location in the facility.

BRIEF DESCRIPTION OF DRAWINGS

Various embodiments in accordance with the present disclosure will be described with reference to the drawings, where like designations denote like elements.

DETAILED DESCRIPTION

Inventory systems are utilized by many entities for storing and managing inventory. For example, some retailers may utilize a warehouse of racks that store inventory items in various bins. When an order for a specific inventory item needs to be filled by the retailer, an associate typically retrieves the inventory item from the bin where the inventory item is stored.

Inventory systems according to one embodiment described herein may utilize hand-propelled (or manual-propelled) transport vehicles (e.g., utility carts, wheel carts, maintenance carts, etc.) to aid in transporting items to different locations within a facility. As used herein, a hand-propelled transport vehicle may be referred to herein as a transport vehicle or cart. In some example operations, the items may be retrieved from inventory, placed on a transport vehicle, and transported to a storage area in preparation for delivery.

In some inventory systems, the transport vehicles may be equipped with one or more electronic devices to aid in managing inventory. For example, the transport vehicles within a facility can be equipped with light sources (e.g., light-emitting diode (LED) lights), a wireless smart controller, wireless communication devices, barcode readers/scanners, etc. These devices can be stored on the transport vehicles and used by associates (e.g., for processing) when items (or packages) are being transported via the transport vehicles. For example, an associate can use handheld or fixed barcode readers located on the transport vehicles to scan items placed on the transport vehicles for identifying information (e.g., destination ID, shipment ID, etc.). In another example, the inventory system can remotely control the light sources on a given transport vehicle via the wireless smart controller on the transport vehicle to emit different color lights, depending on an operating status of the transport vehicle.

In some operations, for instance, an inventory system can use different sets of light sources on each transport vehicle to indicate a level of priority associated with the transport vehicle. For example, the inventory system can turn on the "red" light sources on a first set of transport vehicles to indicate that the first set of transport vehicles are high priority transport vehicles (e.g., the first set of transport vehicles may contain items that are due to be shipped within a first threshold amount of time). In another example, the inventory system can turn on the "yellow" light sources on a second set of transport vehicles to indicate that the second set of transport vehicles are medium priority transport vehicles (e.g., the second set of transport vehicles may contain items that are due to be shipped within a second threshold amount of time). In yet another example, the inventory system can turn on the "green" light sources on a third set of transport vehicles to indicate that the third set of transport vehicles are low priority transport vehicles (e.g., the third set of transport vehicles may contain items that are due to be shipped within a third threshold amount of time). Note, however, that this is merely an example of how an inventory system can use lighting sources on transport vehicles to aid in processing customer orders.

The electronic devices on a transport vehicle are generally battery powered devices, and thus, may have to be recharged depending on, e.g., the amount of use, time since a last recharge, environmental conditions, etc. One conventional technique that is often used to recharge electronic devices involves moving the transport vehicle and/or the electronic devices to a charging station (or location) within the facility dedicated for recharging. In many situations, however, this conventional technique may not be feasible for facilities with a large number of transport vehicles and/or electronic devices (e.g., the number of available charging stations may be limited in the facility). Another conventional technique involves replacing the batteries of electronic device(s) with new (or charged) batteries. However, replacing batteries in this manner can be significantly time consuming and inefficient.

Accordingly, embodiments herein describe a wheel-based generator assembly for charging electronic devices on a transport vehicle, such as a cart. In one particular embodiment described in more detail below, the wheel-based generator assembly can include an omni-directional wheel (also referred to herein as "omni wheel"), a mounting assembly/structure, a gear motor (e.g., a generator), and a voltage regulator (e.g., an alternating current (AC)/direct current (DC) to DC converter). When installed on a cart, the wheel-based generator assembly is configured to convert the mechanical motion of the cart (e.g., as it is being pushed throughout the facility) into electrical energy, which can be used to charge one or more electronic devices on the cart. By charging electronic devices in this manner, embodiments can significantly reduce the amount of time and complexity associated with conventional charging techniques.

Note that while many of the following embodiments use utility carts within a fulfillment center as a reference example of a transport device in a facility in which the wheel-based charging system described herein could be implemented, embodiments are not limited to such utility carts or facilities. For example, the wheel-based charging system described herein can be used for other types of transport devices (e.g., shopping carts, grocery carts, etc.) in other types of facilities (e.g., retail stores, grocery stores, etc.).

Figure 1:
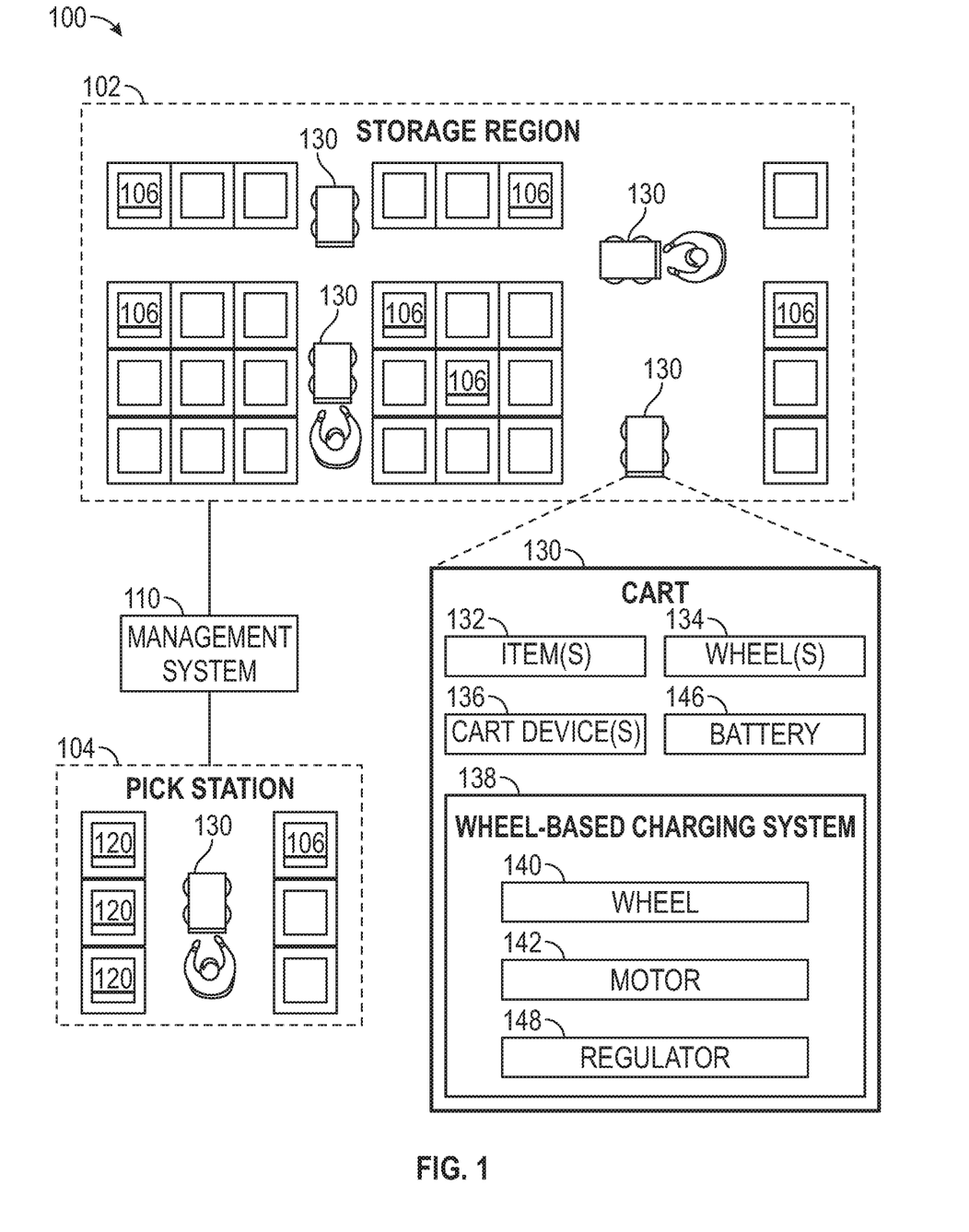
FIG. 1 illustrates an example facility with multiple regions and carts used to transition items about the regions, according to one embodiment.

FIG. 1 illustrates an example inventory system 100 with multiple regions and carts used to transition items about the regions, according to one embodiment. The inventory system 100 may be arranged in a facility or warehouse (e.g., distribution facility, fulfillment center, etc.) that is logically organized into areas or regions associated with various functions. In this depicted example, the facility includes a storage region 102 and a pick station 104. Note, however, that depending upon the size of the inventory system 100, the facility may hold more than one of the storage region 102 and the pick station 104, or the facility may be configured without the storage region 102 or the pick station 104. Other examples of suitable facility operations may include staging at loading zones, transporting to different areas in the facility, loading off vehicles, and so forth.

The inventory system 100 includes one or more inventory holders 106 and one or more (manual or hand-propelled) carts 130 within the storage region 102 and the pick station 104. Note that only some of the inventory holders 106 are shown referenced with the number 106 for ease of illustration. Each inventory holder 106 may be implemented as a physical structure to hold various inventory items. The inventory holder 106 has a physical length, width, and height that may be standardized or varied within the inventory system 100. In general, the inventory holders 106 may be configured to hold essentially any type or size of item or be used for any number of purposes, including, but not limited to, carrying pallets, storing shipping supplies, holding garbage, supporting empty boxes, supporting filled boxes with items once orders are fulfilled, and so on. Additionally, as used herein, inventory holders 106 can include holders for other types of products or items and hence include order holders.

The pick station 104 is designed with multiple locations 120 to accommodate one or more inventory holders 106. In the depicted example, a line of three pick locations 120 is shown next to a set of inventory holders 106. Here, items from one or more of the pick locations 120 may be transferred into one of the inventory holders 106, and vice versa. In another example, items from one or more of the pick locations 120 and/or the inventory holders 106 can be transferred onto the cart 130, and vice versa. Note, however, the depicted storage region 102 and pick station 104 are merely representative, and that the storage region 102 and/or the pick station 104 may have a different configuration and/or different number of inventory holders 106.

The carts 130 are manual or hand-propelled transport devices that can move about the facility, e.g., under the direction of an associate. The carts 130 may be used at various times to transport items from the inventory holders 106 around the facility among the regions. For example, one or more carts 130 can be used to transport items from inventory holders 106 between the storage region 102 and the pick station 104. As shown in FIG. 1, four carts 130 are located in the storage region 102, two of which are being pushed down aisles between sets of inventory holders 106 and another two of which are stationary. Similarly, as shown in FIG. 1, a single cart 130 is being pushed within the pick station 104.

Each cart 130 includes a set of wheels 134, one or more (electronic) cart devices 136, and one or more batteries 146 (e.g., for the cart devices 136). Each cart 130 can be used to transport one or more items 132 throughout a facility. For example, each cart 130 includes a cart frame that provides one or more surface layers/levels for holding/storing various items 132. The set of wheels 134 generally allow the cart device 136 to be pushed or moved in any direction. In one embodiment, for example, the set of wheels 134 can include a set of swivel caster wheels, which allow the cart 130 to move in all directions. The cart 130 can include any number of wheels 134 (e.g., one, two, three, four, etc.).

The cart devices 136 are representative of a variety of electronic devices, which can be used to aid management of operations in the inventory system 100. Examples of such devices 136 can include, but are not limited to, communication devices (e.g., smartphones, tablets, laptops, etc.), wireless controllers, light sources (e.g., LEDs), barcode readers/scanners, etc. In one embodiment, the cart devices 136 can include a smart (wireless) controller that interacts with and communicates with the management system 110 to control other cart devices 136 on the cart 130. For example, the smart controller can receive commands from the management system 110 to turn on/off electronic devices, exchange data with the management system 110, and the like.

Additionally or alternatively, in some embodiments, the cart devices 136 can include different sets of light sources (e.g., different sets/colors of LED lights). In this embodiment, the smart controller can be configured to control the different sets of light sources, based on commands/instructions received via the management system 110. For example, the smart controller on a cart 130 may be configured to turn on a set of "green" LEDs on the cart 130 to indicate that the cart 130 has a low priority status, turn on a set of "yellow" LEDs on the cart 130 to indicate that the cart 130 has a medium priority status, turn on a set of "red" LEDs on the cart 130 to indicate that the cart 130 has a high priority status, and so on. Apart from indicating a priority status, the smart controller can be configured to generate and send electronic notifications to the management system 110 to indicate, e.g., that assistance with the cart 130 is needed, a malfunction has occurred, etc. Each cart device 136 can be powered by one or more rechargeable batteries (also referred to herein as battery packs) 146 that are on the cart 130.

To avoid the need for manual battery recharging (e.g., by plugging the batteries 146 into a charging bay, replacing the batteries 146, etc.), each cart 130 can be equipped with a wheel-based charging system 138 (also referred to herein as a wheel-based generator assembly). The wheel-based charging system 138 is coupled to the batteries 146 and leverages the motion of the cart 130 (e.g., as the cart 130 is being pushed throughout a facility) to recharge the batteries 146. For example, as the cart 130 is pushed throughout the facility, the wheel-based charging system 138 translates the mechanical energy of the motion of the cart 130 into electrical energy, charging the batteries 146. The wheel-based charging system 138 can be installed onto a bottom or side surface of the cart 130.

The wheel-based charging system 138 includes a wheel 140, a motor 142, and a (voltage) regulator 148. In one embodiment, the wheel 140 is an omni wheel that is attached to a bottom surface of the cart 130 and makes contact with the floor. As used herein, an omni wheel refers to a wheel with multiple small discs (or rollers) around the circumference of the wheel which are perpendicular to the turning direction. The omni-wheel enables the wheel-based charging system 138 to move in all directions (e.g., forwards, backwards, laterally, etc.) with the cart 130. Additionally, the omni-wheel can provide charging for the electronic devices 136 bi-directionally (e.g., as the omni-wheel rotates forward and reverse). This allows the wheel-based charging system 138 to generate power to charge the batteries 146 as the cart is pushed in multiple directions (e.g., forwards and backwards).

The wheel 140 is coupled to the motor 142. In one embodiment, the motor 142 is a DC gear motor with a rotatable shaft. The motor 142 can be configured to operate as a generator, e.g., by driving or rotating the shaft of the motor 142 via the wheel 140. When operated as a generator, the motor 142 converts the mechanical energy of the driven shaft into electrical energy, which is used to charge the batteries 146. In some embodiments, the regulator 148 can be used to control (e.g., regulate) the output voltage and polarity of the motor 142, e.g., as the omni-wheel rotates in different (forward/backward) directions. In one embodiment, the regulator 148 is an AC/DC to DC converter. In this manner, the wheel-based charging system 138 can use the motion of the cart 130 within the facility to recharge batteries 146 for one or more cart devices 136.

Note that although FIG. 1 depicts the cart 130 with a single wheel-based charging system 138, in some embodiments, the cart 130 can include multiple wheel-based charging systems 138. In these embodiments, a first wheel-based charging system 138 can be attached to a first side of the cart and a second wheel-based charging system 138 can be attached to a second side of the cart, such that the wheels 140 of the respective first and second wheel-based charging systems 138 are orthogonal with respect to each other. Equipping a cart 130 with multiple wheel-based charging systems 138 in this manner can enable the wheel-based charging systems 138 to generate power to charge the batteries 146 in any direction that the cart 130 is pushed.

Figure 2:
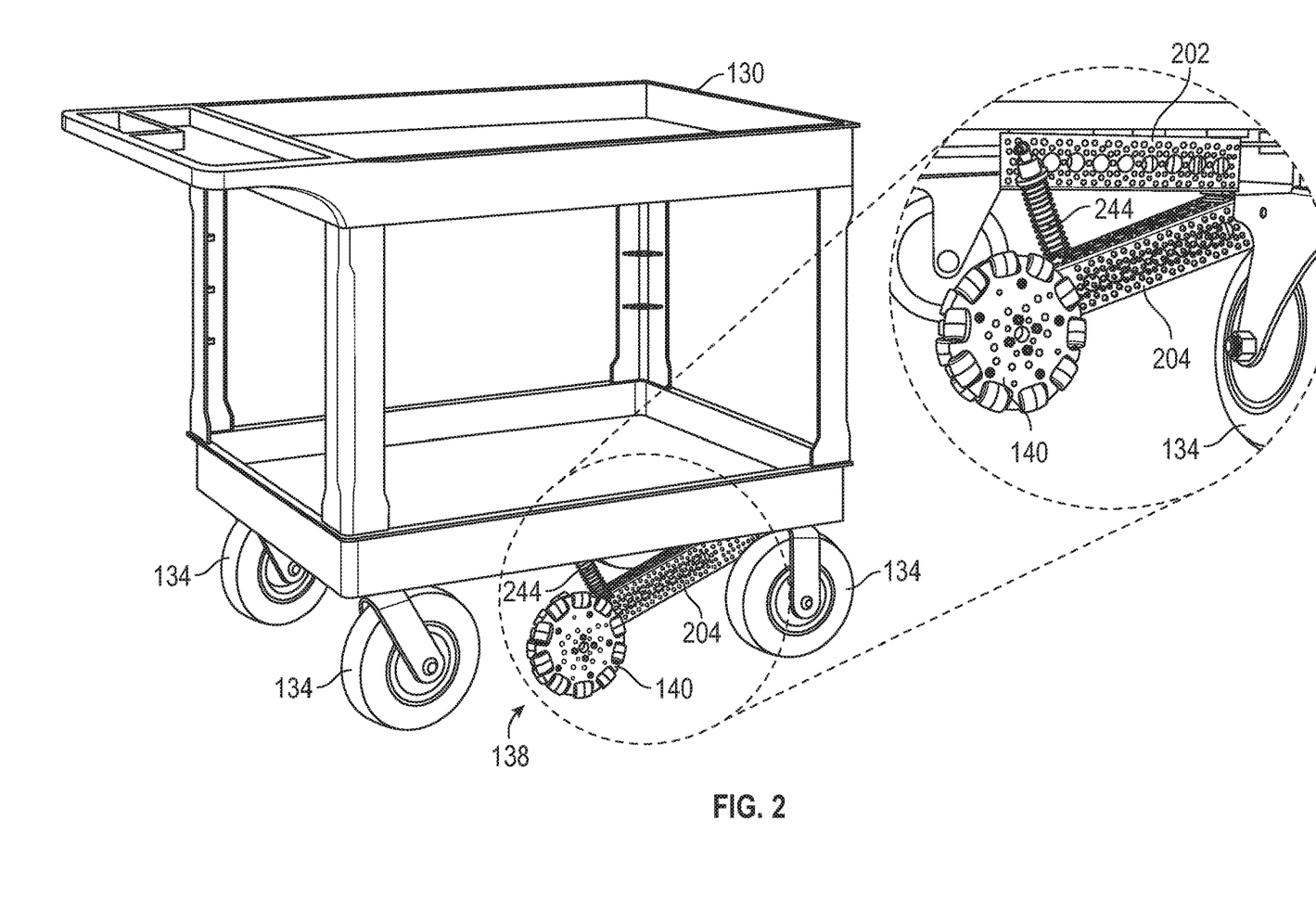
FIG. 2 illustrates an example cart equipped with a wheel-based charging system, according to one embodiment.

FIG. 2 illustrates an example cart 130 equipped with a wheel-based charging system 138, according to one embodiment. Although in this example, the cart 130 is depicted with four wheels 134, the cart 130 can include any number of wheels 134. Similarly, while the cart 130 is shown with a cart frame that provides two levels/layers for holding and transporting items, in other examples, the cart 130 can include any number of levels/layers (e.g., a single level/layer, three levels/layers, etc.). In general, the cart 130 can have a variety of different configurations and/or be formed from a variety of materials (e.g., metal, plastic, wood, etc.) suitable for holding one or more items. For example, the top layer and/or bottom layer of the cart 130 can have a surface shape that is substantially planar, crowned, domed, irregular, or any other shape or combination of shapes. In another example, a first set of the carts 130 within the facility may have different clearances (e.g., from the ground) than a second set of the carts 130.

As noted, the cart 130 is manually propelled (e.g., by pushing, by pulling, etc.) and can be moved around in any direction, via the wheels 134. The wheels 134 are typically load-bearing wheels, which support the weight of items that are transported via the cart 130. The wheel-based charging system 138 can be mounted to a bottom surface or side surface of the cart 130 via a mounting structure/assembly. In one embodiment, the mounting structure is formed by a support member 202, a support member 204, and a spring 244. As shown in FIG. 2, for example, the support member 202, the support member 204, and spring 244 form a triangular mounting structure. In one embodiment, the support members 202 and 204 are hinged (metal) beams that allow for mounting the wheel-based charging system 138 underneath the cart 130 (e.g., as depicted in FIG. 2) or to a side of the cart 130 (not shown). In one embodiment, the spring 244 acts as shock absorber, which provides a flexible mounting clearance for the wheel-based charging system 138 for carts of various sizes. Additionally, the spring 244 is used to press the wheel 140 against the floor, while the cart 130 is pushed across the floor. For example, the spring 244 can be configured to provide a force sufficient to keep the wheel 140 pressed against the floor, while the cart 130 is pushed across the floor. The wheel 140 of the wheel-based charging system 138 may be a non-loading bearing wheel of the cart 130.

Figure 3:
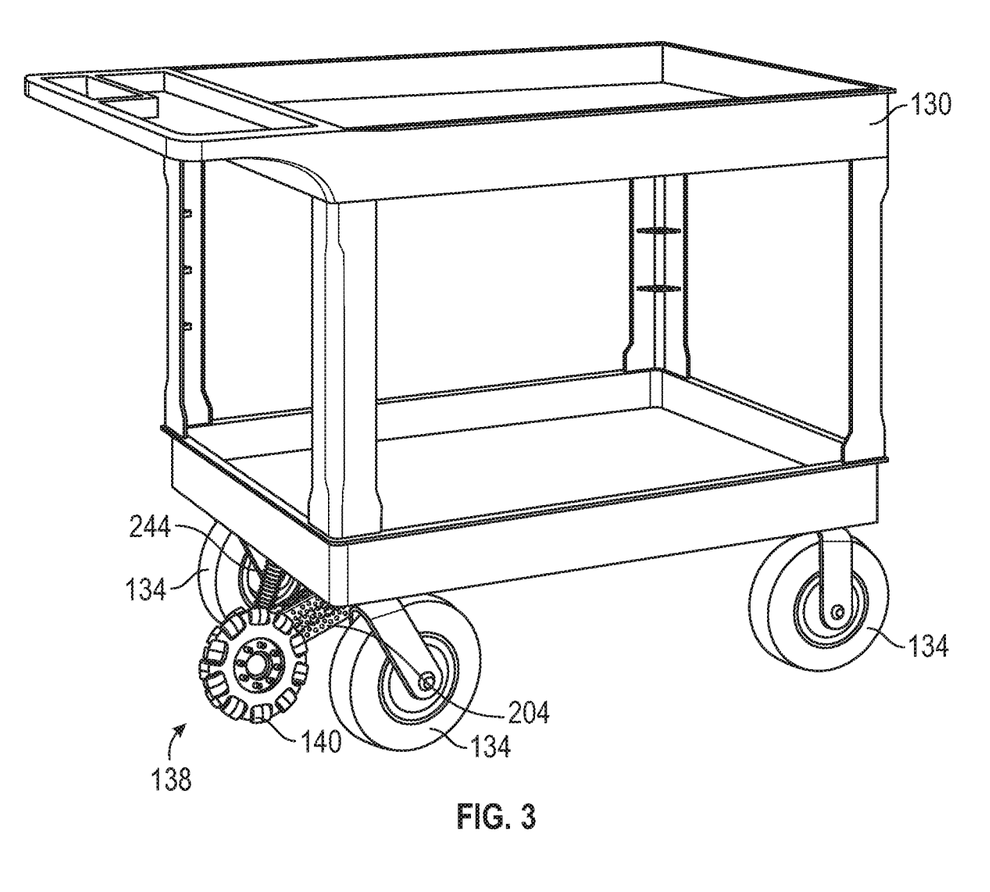
FIG. 3 illustrates another example cart equipped with a wheel-based charging system, according to one embodiment.

Note that FIG. 2 depicts merely a reference example of how the wheel-based charging system 138 can be attached to the cart 130 and that the wheel-based charging system 138 can be attached to the cart 130 in other locations. For example, while FIG. 2 depicts the wheel-based charging system 138 located at a front side of the cart 130, in some embodiments, the wheel-based charging system 138 can be located at the back side of the cart 130, left side of the cart 130, or right side of the cart 130. FIG. 3, for example, illustrates a cart 130 equipped with a wheel-based charging system 130 that is located at the back side of the cart 130, according to one embodiment. Compared to the wheel 140 of the wheel-based charging system 130 depicted in FIG. 2, here in FIG. 3, the wheel 140 of the wheel-based charging system 130 is not located underneath the bottom side of the cart 130. In this manner, the wheel-based charging system 138 can be flexibly attached to the cart 130 at different locations of the cart 130 to accommodate different cart configurations, facility configurations, etc.

In some embodiments, instead of using an additional wheel 140, the wheel-based charging system 138 can be configured to use one of the wheels 134 instead. For example, in this embodiment, the shaft of the motor 142 can be coupled to one of the wheels 134, such that the rotation of the wheel 134 drives the shaft of the motor 142, generating electrical energy. Similarly, in this embodiment, the regulator 148 can be used to regulate the voltage output and polarity of the motor 142.

Figure 4:
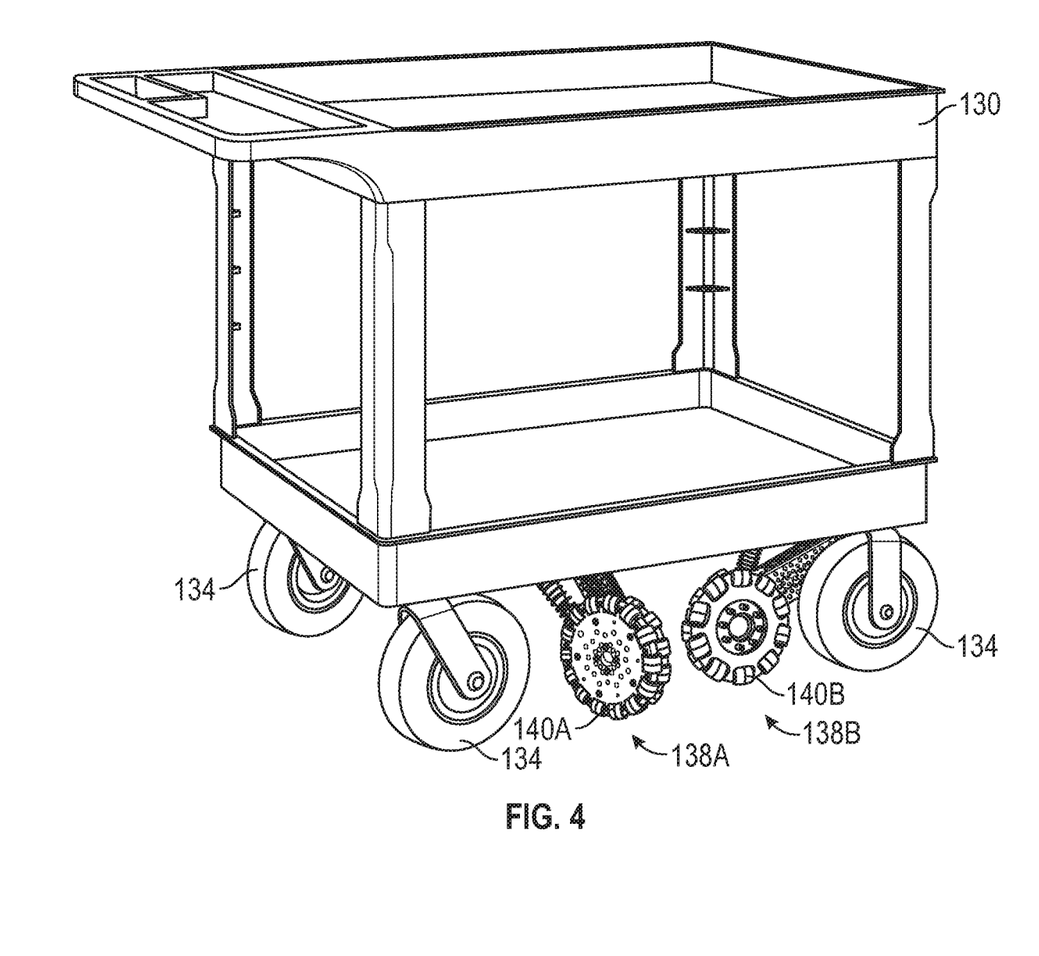
FIG. 4 illustrates an example cart equipped with multiple wheel-based charging systems, according to one embodiment.

In some embodiments, the cart 130 can be equipped with multiple wheel-based charging systems 138, each using a separate wheel 140 to charge the batteries 146. FIG. 4 illustrates an example cart 130 equipped with two wheel-based charging systems 138A and 138B, according to one embodiment. Here, the wheel-based charging system 138A includes a (omni) wheel 140A and the wheel-based charging system 138B includes a (omni) wheel 140B. In some embodiments, the wheel-based charging systems 138A and 138B can be mounted to the cart 130 at different locations so that the wheels 140A and 140B are orthogonal with respect to each other. Here, for example, the wheel-based charging system 138B is located at a front side of the cart 130 and the wheel-based charging system 138A is located at an adjacent side of the cart 130, so that the wheels 140A and 140B are orthogonal with respect to each other. The wheel-based charging systems 138A and 138B can include respective first and second motors 142 coupled to the respective wheels 140A and 140B for converting the mechanical motion of the respective wheel into electrical energy. In addition, a first regulator 148 can be coupled to the first motor 142 to control an output voltage of the first motor 142 and/or polarity of the output voltage of the first motor 142, and a second regulator 148 can be coupled to the second motor 142 to control an output voltage of the second motor 142 and/or polarity of the output voltage of the second motor 142. As noted, with multiple wheel-based charging systems configured in this manner, embodiments can provide charging for the batteries 146 in any direction that the cart 130 is moved.

Figure 5:
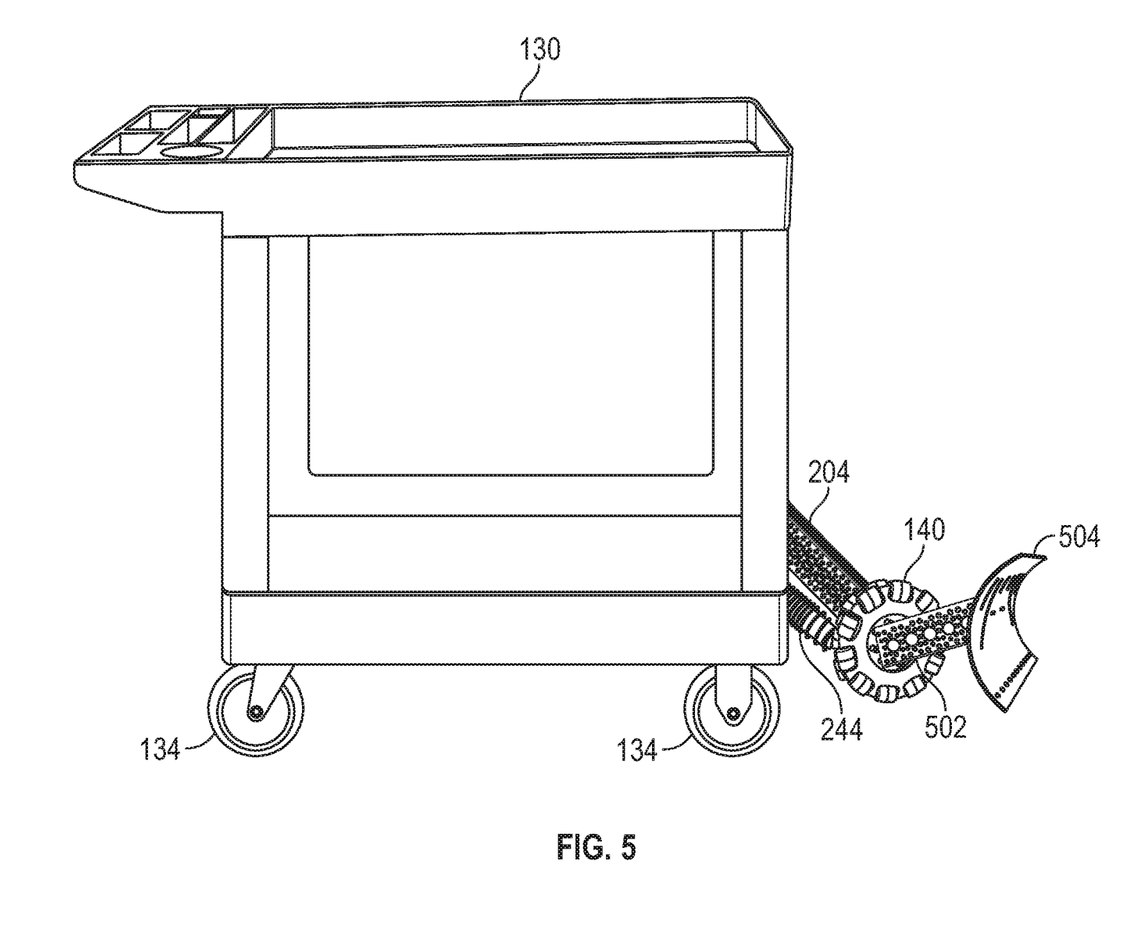
FIG. 5 illustrates yet another example cart equipped with a wheel-based charging system, according to one embodiment.

FIG. 5 illustrates another example cart 130 equipped with a wheel-based charging system 138, according to one embodiment. Compared to the wheel-based charging system depicted in FIG. 2, in this embodiment, the wheel-based charging system 138 is mounted to a front side of the cart 130 (e.g., as opposed to underneath the cart 130). Additionally, in this embodiment, the wheel 140 is positioned in front of the cart 130 (e.g., relative to the front side of the cart 130). Further, in this embodiment, a plowing mechanism 504 is coupled to the wheel 140 via a support member 502. The plowing mechanism 504 is configured to clear debris (e.g., dust, paper, trash, etc.) that may be on the floor of the facility to reduce the amount of debris encountered by the wheel 140. Note that the plowing mechanism 504 depicted in FIG. 5 is merely an example. In general, the plowing mechanism 504 can have a variety of different configurations/shapes and/or be formed from a variety of materials (e.g., metal, plastic, etc.) suitable for clearing debris and other articles from the floor.

Figure 6A:
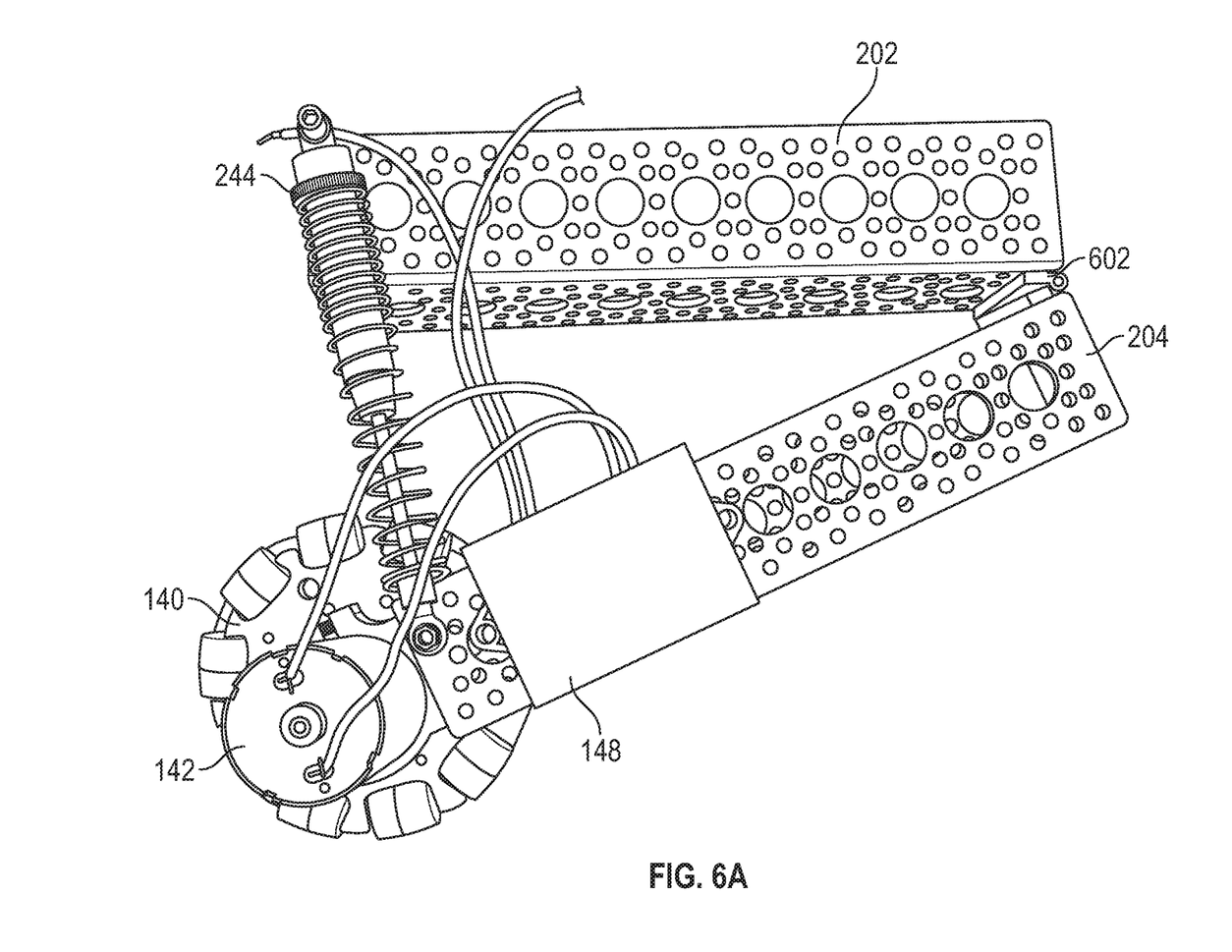
FIG. 6A illustrates a side view of an example wheel-based charging system, according to one embodiment.
Figure 6B:
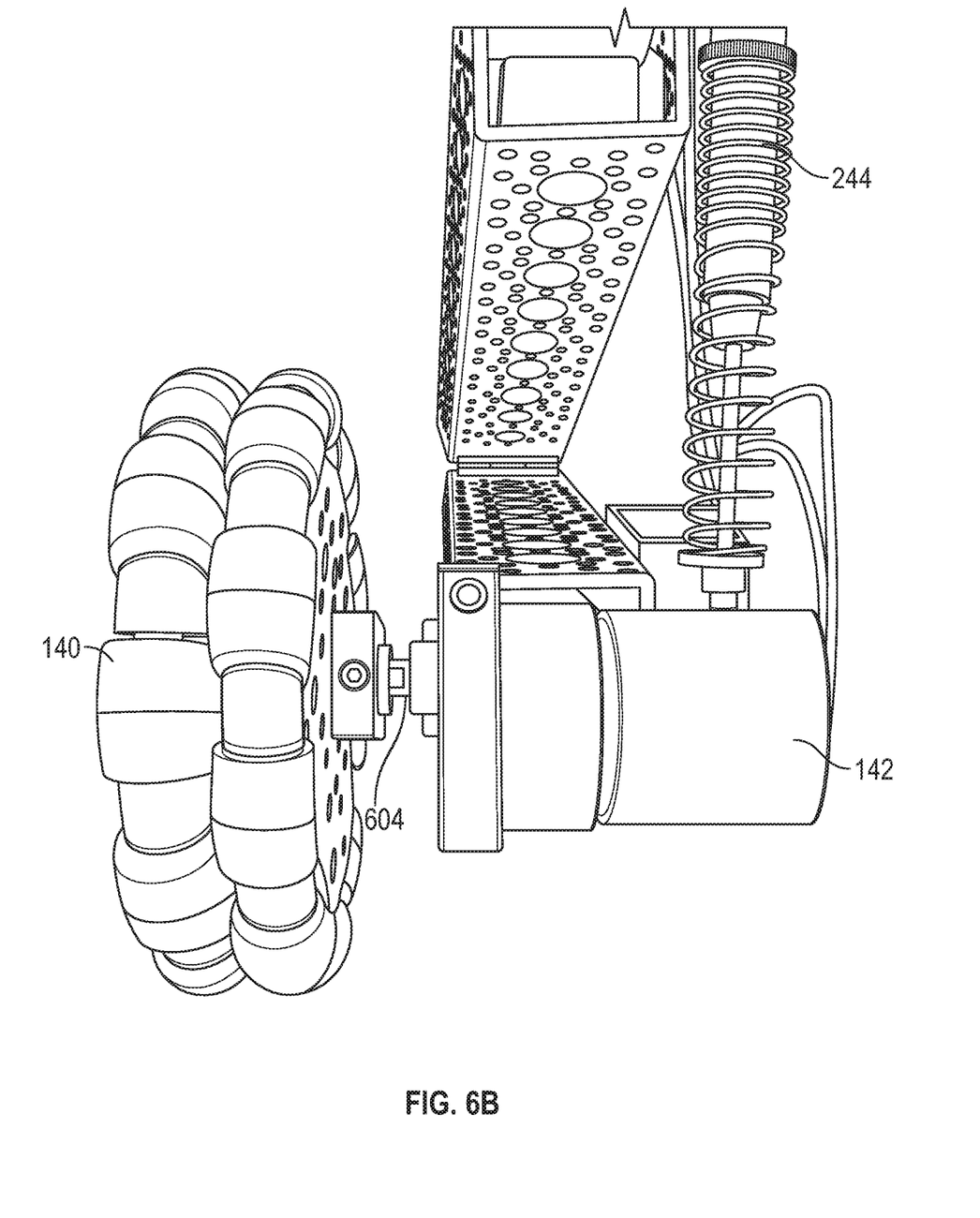
FIG. 6B illustrates a back view of an example wheel-based charging system, according to one embodiment.
Figure 6C:
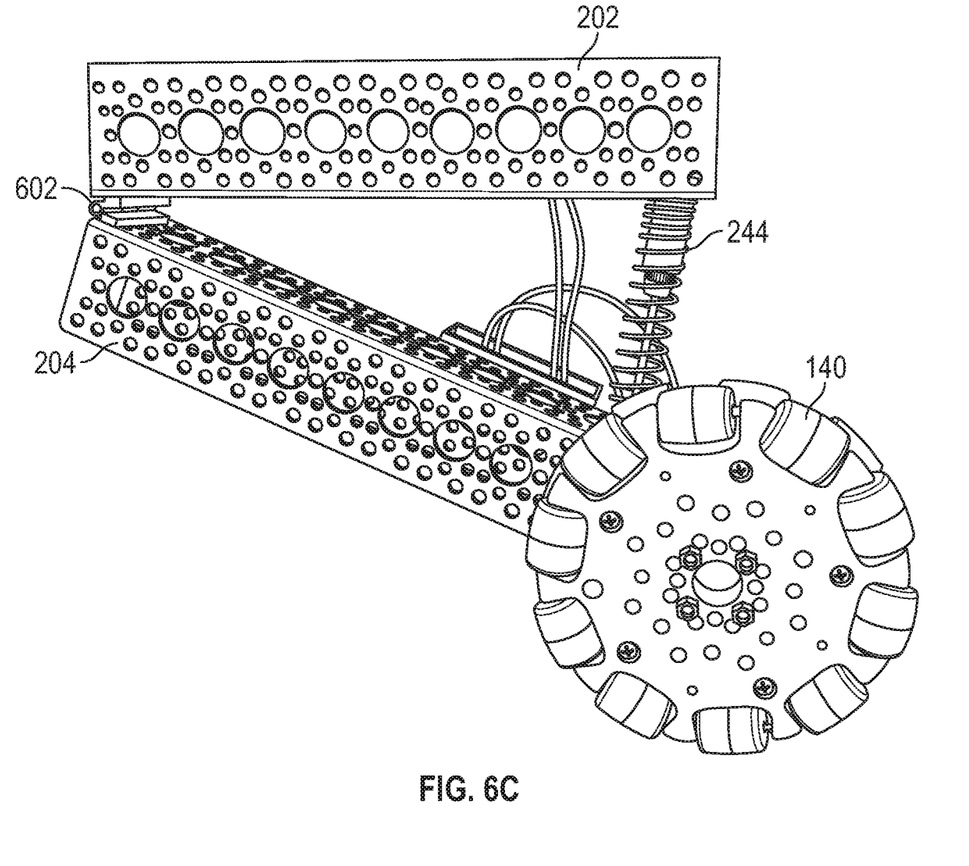
FIG. 6C illustrates another side view of an example wheel-based charging system, according to one embodiment.

FIGS. 6A-6C illustrate different views of an example wheel-based charging system 138, according to one embodiment. In particular, FIG. 6A shows a side view of the wheel-based charging system 138, FIG. 6B shows a back view of the wheel-based charging system 138, and FIG. 6C shows another side view of the wheel-based charging system 138. In this embodiment, the wheel-based charging system 138 includes the support member 202, the support member 204, the spring 244, the wheel 140, the motor 142, and the regulator 148.

The support members 202 and 204 may have a variety of shapes and/or configurations suitable for mounting or installing the wheel-based charging system 138 to the cart 130. For example, in one embodiment, the support members 202 and 204 are C-shaped metal beams. The C-shaped metal beams allow for mounting the wheel-based charging system 138 to different sides of the cart 130. Here, for example, the support member 202 is mounted to an inner side of the cart 130 (e.g., via screws, bolts, etc.) at the bottom layer/level of the cart 130. In other embodiments, the support member 202 can be mounted to a bottom surface of the cart 130, an outer side of the cart 130, etc. Note that although the support members 202 and 204 are depicted with cutouts, in other embodiments, the support members 202 and 204 may include a fewer amount (or no amount) of cutouts.

The support member 202 and the support member 204 are hinged support members (e.g., they are connected at a hinge 602 via screws, bolts, etc.). The hinge 602 is located at ends of the support member 202 and the support member 204. The opposite end of the support member 202 (e.g., the end opposite the hinge 602) is coupled to the spring 244 at an (first) end of the spring 244, and the opposite end of the support member 204 (e.g., the end opposite the hinge 602) is coupled to the spring 244 at an (second) opposite end of the spring 244. This particular configuration of the support members 202, 204 and the spring 244 forms a triangular mounting structure. For example, in this triangular structure, the spring 244 acts as a shock absorber, providing sufficient clearance for mounting the wheel-based charging system 138 to carts 130 of various sizes, while also providing sufficient force to keep the wheel 140 pressed against the floor.

The wheel 140 is coupled to the support member 204 at an opposite end of the support member from the hinge 602 and on one side of the wheel 140. Additionally, the motor 142 is coupled to the wheel 140 on this same side of the wheel 140. In particular, as shown in FIG. 6B, the wheel 140 is coupled to a rotatable shaft 604 of the motor 142. Here, the motor 142 is driven by the wheel 140 to generate electricity. For example, the wheel 140 is capable of rotating in two directions (e.g., bi-directionally) in order to drive the motor 142. Further, by using an omni wheel for the wheel 140, the wheel 140 adds minimal friction when the cart 130 moves in orthogonal directions. As shown in FIG. 6A, the regulator 148 is attached to the support member 204 on one side of the support member proximal to the end of the support member that is coupled to the spring 244. Note, however, that the regulator 148 can be located elsewhere on the wheel-based charging system 138, such as on the support member 202, a different location on the support member 204, on the cart 130, etc.

Figure 7:
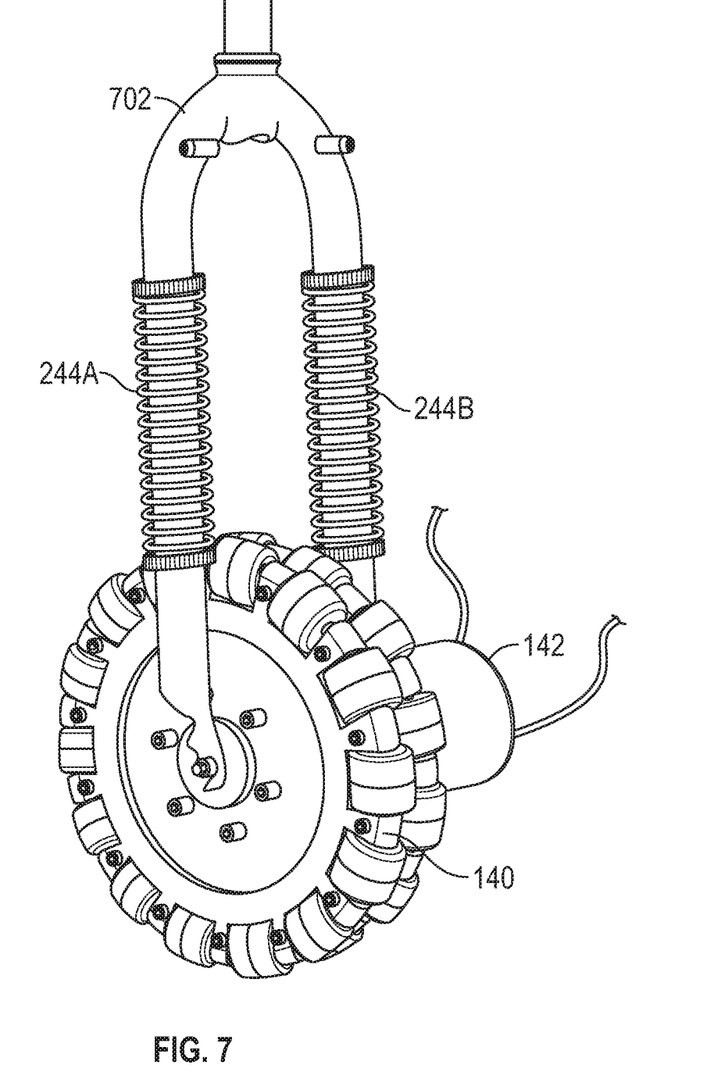
FIG. 7 illustrates another example of a wheel-based charging system, according to one embodiment.

It should be noted that the wheel-based charging system 138 depicted in FIGS. 6A-6C is merely a reference example of a wheel-based charging system that can be attached or installed on a cart 130. In other embodiments, the wheel-based charging system 138 can have other configurations. FIG. 7, for example, illustrates another wheel-based charging system 138 that can be installed on cart 130, according to one embodiment. In FIG. 7, the wheel-based charging system 138 includes a wheel fork 702 which is connected to a wheel 140. The wheel 140 is coupled to a motor 142 on one side of the wheel 140 and to a spring 244 on an opposite side of the wheel 140. Further, while a regulator 148 is not shown in FIG. 7, in some embodiments, a regulator 148 can be coupled to an output of the motor 142.

The wheel fork 702 provides a mounting structure for the wheel-based charging system 138. For example, the wheel fork 702 can be attached to the cart 130 (e.g., at the bottom, side, etc.) at one end of the wheel fork 702 and the other end of the wheel fork 702 can be attached to the wheel 140. As shown, a first spring 244A is coupled to one prong of the wheel fork 702 and a second spring 244B is coupled to another prong of the wheel fork 702. The wheel fork 702 can provide sufficient force, via springs 244A and 244B, for keeping the wheel 140 pressed against the floor, such that the wheel 140 rotates when the cart 130 is pushed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A wheel-based charging apparatus attached to a cart, the wheel-based charging apparatus comprising:
   a direct current (DC) motor including a rotatable shaft;
   an omni-directional wheel coupled to the rotatable shaft, the omni-directional wheel configured to drive the DC motor as the cart is pushed across a floor in any direction including a forward direction forward lateral direction, or a backward lateral direction, the generator being configured to transform mechanical energy from motion of the omni-directional wheel into electrical energy for charging one or more batteries of one or more electronic devices on the cart; and
   a regulator coupled to the DC motor and configured to control an output voltage of the DC motor and a polarity of the output voltage of the DC motor based at least in part on the omni-directional wheel driving the DC motor, wherein:
      when the omni-directional wheel is pushed across the floor in the forward direction or in the forward lateral direction, the omni-directional wheel rotates the DC motor in a first direction and the regulator controls the output voltage and the polarity of the output voltage of the DC motor relative to the first direction for charging the one or more batteries of the one or more electronic devices on the cart, and
      when the omni-directional wheel is pushed across the floor in the backward direction or in the backward lateral direction, the omni-directional wheel rotates the DC motor in a second direction opposite the first direction, and the regulator controls the output voltage and the polarity of the output voltage of the DC motor relative to the second direction for charging the one or more batteries of the one or more electronic devices on the cart.

2. The wheel-based charging apparatus of claim 1, further comprising:
   a mounting assembly configured to attach the wheel-based charging apparatus to the cart and press the omni-directional wheel against the floor as the cart is pushed across the floor in any direction including the forward direction, the backward direction, the forward lateral direction, or the backward lateral direction.

3. The wheel-based charging apparatus of claim 2, wherein:
   the mounting assembly comprises a first beam, a second beam, and a spring;
   a first end of the first beam is coupled to a first end of the second beam via a hinge; and
   a second end of the first beam is coupled to a second end of the second beam via the spring.

4. The wheel-based charging apparatus of claim 3, wherein:
   the first beam is mounted to the cart; and
   the omni-directional wheel is coupled to the second beam and the spring at the second end of the second beam.

5. The wheel-based charging apparatus of claim 4, wherein the first beam is mounted underneath the cart.

6. The wheel-based charging apparatus of claim 1, wherein the cart comprises:
   a cart frame providing at least one surface layer for holding the one or more batteries and the one or more electronic devices.

7. The wheel-based charging apparatus of claim 6, further comprising a set of wheels connected to the cart frame.

8. The wheel-based charging apparatus of claim 7, wherein the set of wheels comprises a set of swivel caster wheels connected to the cart frame.

9. A cart, comprising:
   a cart frame providing at least one surface layer for holding one or more items, one or more electronic devices, and one or more rechargeable battery packs for the one or more electronic devices;
   a set of wheels connected to the cart frame; and
   a wheel-based charging system configured to charge the rechargeable battery packs as the cart is pushed across a floor in any direction including a forward direction, a backward direction, a forward lateral direction, or a backward lateral direction, the wheel-based charging system comprising:
      a direct current (DC) motor including a rotatable shaft;
      an omni-directional wheel coupled to the rotatable shaft and configured to drive the DC motor as the cart is pushed across the floor in any direction including the forward direction, the backward direction, the forward lateral direction, or the backward lateral direction, the DC motor being configured to transform mechanical energy from motion of the first omni-directional wheel into electrical energy for charging the rechargeable battery packs;
      a regulator coupled to the DC motor and configured to control an output voltage of the DC motor and a polarity of the output voltage of the DC motor based at least in part on the omni-directional wheel driving the DC motor, wherein:
         when the omni-directional wheel is pushed across the floor in the forward direction or in the forward lateral direction, the omni-directional wheel rotates the DC motor in a first direction and the regulator controls the output voltage and the polarity of the output voltage of the DC motor relative to the first direction for charging one or more batteries of the one or more electronic devices on the cart, and
         when the omni-directional wheel is pushed across the floor in the backward direction or in the backward lateral direction, the omni-directional wheel rotates the DC motor in a second direction opposite the first direction, and the regulator controls the output voltage and the polarity of the output voltage of the DC motor relative to the second direction for charging the one or more batteries of the one or more electronic devices on the cart; and
      a mounting assembly attaching the wheel-based charging system to the cart frame.

10. The cart of claim 9, wherein:
the mounting assembly comprises a first beam, a second beam, and a spring;
a first end of the first beam is coupled to a first end of the second beam via a hinge; and
a second end of the first beam is coupled to a second end of the second beam via the spring.

11. The cart of claim 10, wherein:
the first beam is mounted to the cart; and
the omni-directional wheel is coupled to the second beam and the spring at the second end of the second beam.

12. The cart of claim 10, wherein the first beam is mounted underneath the cart.

13. The cart of claim 9, wherein the set of wheels comprises a set of swivel caster wheels connected to the cart frame.

14. A cart, comprising:
a cart frame having at least one surface for holding one or more electronic devices, and one or more rechargeable battery packs for the one or more electronic devices;
a wheel-based charging system configured to charge the one or more rechargeable battery packs as the cart is pushed across a floor in any direction including a forward direction, a backward direction, a forward lateral direction, or a backward lateral direction, the wheel-based charging system comprising:
an omni-directional wheel coupled to and configured to drive a DC motor as the cart is pushed across the floor in any direction including the forward direction, the backward direction, the forward lateral direction, or the backward lateral direction, the DC motor being configured to transform mechanical energy from motion of the omni-directional wheel into electrical energy for charging the one or more rechargeable battery packs; and
a regulator coupled to the DC motor and configured to control an output voltage of the DC motor and a polarity of the output voltage of the DC motor based at least in part on the omni-directional wheel driving the DC motor, wherein:
when the omni-directional wheel is pushed across the floor in the forward direction or in the forward lateral direction, the omni-directional wheel rotates the DC motor in a first direction and the regulator controls the output voltage and the polarity of the output voltage of the DC motor relative to the first direction for charging one or more batteries of the one or more electronic devices on the cart, and
when the omni-directional wheel is pushed across the floor in the backward direction or in the backward lateral direction, the omni-directional wheel rotates the DC motor in a second direction opposite the first direction, and the regulator controls the output voltage and the polarity of the output voltage of the DC motor relative to the second direction for charging the one or more batteries of the one or more electronic devices on the cart.

15. The cart of claim 14, further comprising:
a mounting assembly configured to attach the wheel-based charging system to the cart and press the omni-directional wheel against the floor as the cart is pushed across the floor in any direction including the forward direction, the backward direction, the forward lateral direction, or the backward lateral direction.

16. The cart of claim 15, wherein:
the mounting assembly comprises a first beam, a second beam, and a spring;
a first end of the first beam is coupled to a first end of the second beam via a hinge; and
a second end of the first beam is coupled to a second end of the second beam via the spring.

17. The cart of claim 16, wherein:
the first beam is mounted to the cart; and
the omni-directional wheel is coupled to the second beam and the spring at the second end of the second beam.

18. The cart of claim 17, wherein the first beam is mounted underneath the cart.

19. The cart of claim 14, further comprising a set of wheels connected to the cart frame.

20. The cart of claim 19, wherein the set of wheels comprises a set of swivel caster wheels connected to the cart frame.

* * * * *